United States Patent [19]

Ishizaka

[11] Patent Number: 5,757,985
[45] Date of Patent: May 26, 1998

[54] SEMICONDUCTOR MACH-ZEHNDER-TYPE OPTICAL MODULATOR

[75] Inventor: Masashige Ishizaka, Tokyo, Japan

[73] Assignee: NEC Corporation, Tokyo, Japan

[21] Appl. No.: 558,833

[22] Filed: Nov. 15, 1995

[30] Foreign Application Priority Data

Nov. 16, 1994 [JP] Japan ................................. 6-281044

[51] Int. Cl.⁶ ....................................................... G02F 1/035
[52] U.S. Cl. ........................ 385/2; 385/1; 385/3; 385/14; 385/39; 385/40; 385/131; 385/132
[58] Field of Search ............................... 385/1, 2, 3, 14, 385/15, 16, 27, 39, 40, 41, 130, 131, 132

[56] References Cited

U.S. PATENT DOCUMENTS

| | | | |
|---|---|---|---|
| 4,872,744 | 10/1989 | Abeles et al. | 257/18 X |
| 5,074,631 | 12/1991 | Hamano et al. | 385/3 |
| 5,168,534 | 12/1992 | McBrien et al. | 385/3 |
| 5,283,842 | 2/1994 | Hakogi et al. | 385/3 |
| 5,347,601 | 9/1994 | Ade et al. | 385/3 |
| 5,652,807 | 7/1997 | Fukuchi | 385/3 |
| 5,655,034 | 8/1997 | Ishizaka et al. | 385/3 |

FOREIGN PATENT DOCUMENTS

| | | | |
|---|---|---|---|
| 606093 | 1/1994 | European Pat. Off. | 385/3 X |
| 662628 | 12/1994 | European Pat. Off. | 385/3 X |

OTHER PUBLICATIONS

Rolland, C., et al., "10 Gbit/s, 1.56 um multiquantum well InP/InGaAsP Mach-Zehnder optical modulator", Electronic Letters, vol. 29, No. 5, Mar. 4, 1993.

Aoki, M., et al., "New photonic device integration by selective-area MOVPE and its application to optical modulator/laser integration", Microwave and Optical Technology Letters, vol. 7, No. 3, Feb. 20, 1994.

Takahashi, M., et al., "In-plane quantum energy control of InGaAs/InGaAsP MQW structure by MOCVD selective area growth", Proceedings of the fourth International Conference on Indium Phosphide and Related Materials, Apr. 21-24, 1992, pp. 206-209.

H. Sano, et al., "High Speed Properties of InGaAs/InAlAs MQW Mach-Zehender Optical Modulators", A collection of papers for lectures in the Spring Convention of Electronic Information Communication Associate of 1993, Separate vol. No. 4, pp. 4-187.

M. Takahashi, et al., "In-Plane Eg Control of InGaAs/InGaAsP MQW Structure by MOCVD Selective Area Growth", Optical Electronic Research Associate (OQE), OQE 91-176, pp. 49-54.

M. Aoki, et al., "In-Plane Bandgap Energy Control Technique and its Application to a Modulator Integrated DFB Laser", The Spring Convention of Electronic Information Communication Associate of 1993, SC-2-6, pp. 4-430-4-431.

H. Sano, et al., "High-Speed InGaAs/InAlAs MQW Mach-Zehnder-Type Optical Modulator", OFC/IOOC'93 Technical Digest, pp. 215-217.

M. Aoki, et al., "High-Speed (10 Gbit/s) and Low-Drive-Voltage (1V Peak to Peak) InGaAs/InGaAsP MQW Electroabsorption-Modulator Integrated DFB Laser With Semi-Insulating Buried Heterostructure", Electronic Letters, Jun. 4, 1992, vol. 28, No. 12, pp. 1157-1158.

Primary Examiner—Brian Healy

[57] ABSTRACT

In a semiconductor Mach-Zehnder modulator, when a phase modulator portion 113 and other passive areas (incident light waveguide path 111, a branch portion 112, a joint portion 114 and an output light waveguide path 115) are formed, a buffer layer 102, a waveguide layer 103 and a clad layer 104 are successively and selectively formed on a semiconductor substrate 101. At this time, a pair of masks having a gap therebetween are used as a selective growth mask. The phase modulator portion 113 is formed in the gap portion of the masks, and the passive areas are formed in the other portions. The band gap and the layer thickness can be partially or locally varied by adjusting the width of the masks and the gap portion.

12 Claims, 8 Drawing Sheets

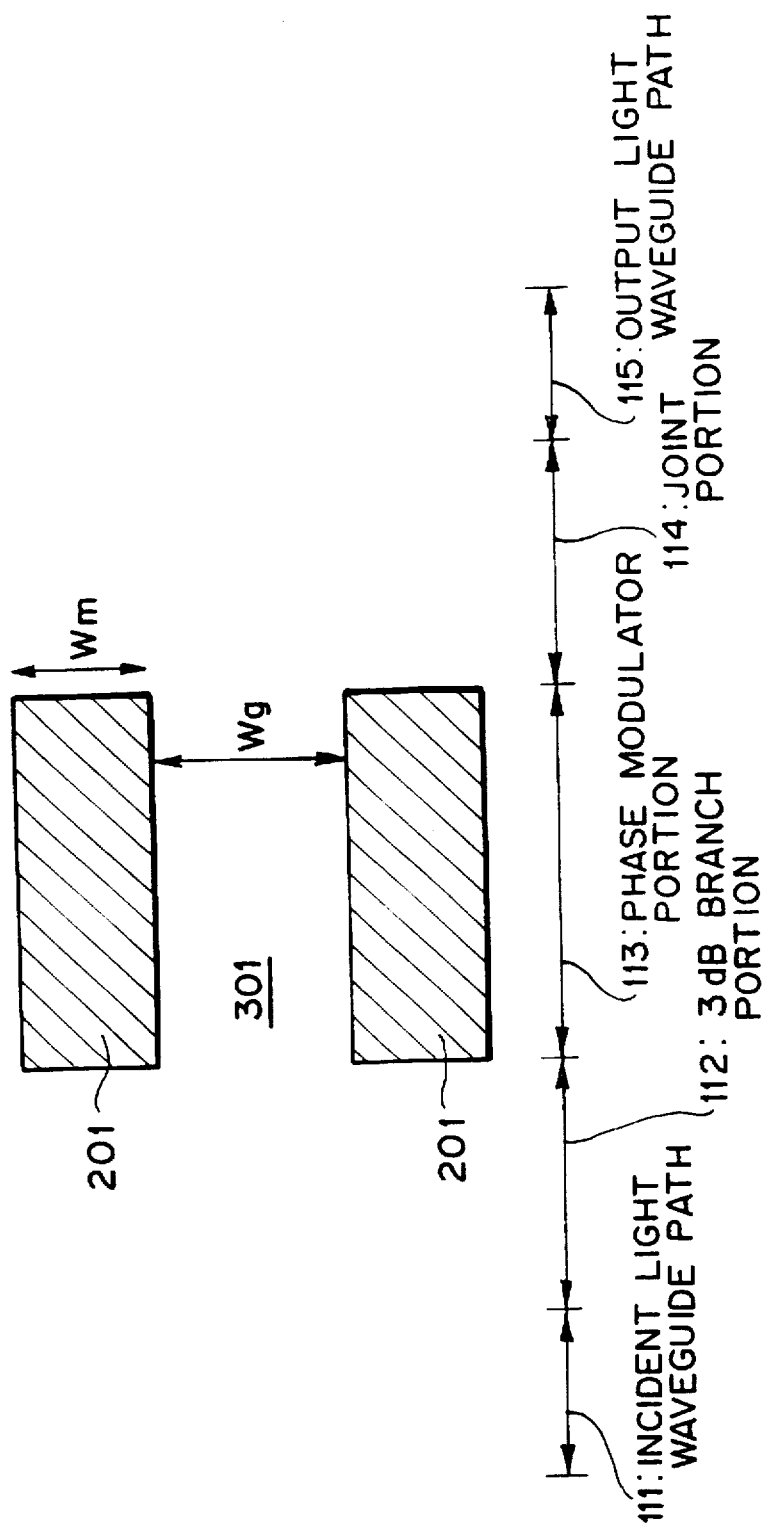

SEMICONDUCTOR MACH-ZEHNDER-TYPE OPTICAL MODULATOR

BACKGROUND OF THE INVENTION

1. Field of the Invention

The present invention relates to an optical modulator which serves as an important element in an optical communication system, an optical information processing system, etc., and more particularly to the structure of a Mach-Zehnder type optical modulator which operates with a low driving voltage and has low lightwave loss, and a method of manufacturing the Mach-Zehnder type optical modulator.

2. Description of Related Art

A waveguide type optical device such as a semiconductor laser, an optical modulator or the like has been known as a key element for a high-speed optical communication system, an optical information processing system, etc., and it has been increasingly studied and developed in various fields.

Recently, a high-speed operation and a long-distance communication in an optical communication system have been followed by occurrence of problems which are inherent to a conventional direct modulation system using a semiconductor laser. In the semiconductor-laser direct modulation system, wavelength chirping occurs when modulation is carried out. This chirping causes waveform deterioration after fiber transmission, and this phenomenon is more remarkable as a signal transmission speed is high or as a transmission distance is long.

This problem is most critical particularly in a system using an existing 1.3 μm zero-dispersion fiber. For example, even when a light source which has a 1.55 μm-wavelength band and has a low fiber transmission loss is used to lengthen the transmission distance, the transmission distance is restricted by dispersion limitation due to the chirping. This problem can be overcome by adopting an external modulation system in which a semiconductor laser is actuated to emit light beams having constant output power and the emission light output from the semiconductor laser is modulated by an optical modulator which is provided separately from the semiconductor laser. Accordingly, the development of external optical modulators has been recently promoted.

An optical modulator using dielectric substance of LiNbO₃ or the like, and another optical modulator using semiconductor of InP or GaAs may be used as the external optical modulator as described above, and of these modulators, the semiconductor optical modulator has been increasingly expected because it can be integrated with other optical elements such as an optical amplifier, etc., or electronic circuits such as an FET, etc., and it can be easily miniaturized and it can reduce its driving voltage.

As the semiconductor modulator are typically known an absorption type optical modulator using a Franz-Keldysh effect of bulk semiconductor or a quantum confined stark effect (QCSE) in multi-quantum (multiple quantum) wells (MQW) in which an absorption edge of a semiconductor is shifted to a long wavelength side by applying electric field to the semiconductor, and a Mach-Zehnder type modulator using an electro-optical effect (Pockels effect) of bulk semiconductor or a quantum confined stark effect in multi-quantum wells in which refractive index varies in accordance with application of electric field.

Here, the Franz-Keldysh effect means such an effect that the shape of the absorption spectrum of light is varied in accordance with application of the electric field), and the stark effect means such an effect that the spectrum is shifted to a long wavelength side while keeping its peak shape when electric field is applied. As compared with the semiconductor-laser direct modulation system, the absorption type modulator has extremely smaller wavelength chirping, but the degree of the chirping is not reduced to zero. On the other hand, according to the principle of the Mach-Zehnder type modulator, its chirping can be expected to be reduced to zero, and thus it is increasingly expected as a future modulator for ultra high-speed and long-distance optical communication.

As an example of the semiconductor Mach-Zehnder modulator, a high-mesa type Mach-Zehnder modulator using an InGaAs/InAlAs multi-quantum well structure as a waveguide layer has been reported by Sano, et al. in a collection of papers for lectures in the spring Convention of Electronic Information Communication Associate of 1993, Separate Volume No. 4, pp 4–187 (Lecture No. C-150).

In this report, for laser beams of 1.55 μm wavelength, MQW is constructed by 6.5 nm InGaAs wells and 6.0 nm InAlAs barriers, and the band gap wavelength of the MQW is set to 1.45 μm. A waveguide layer is constructed of 30 periods of InGaAs/InAlAs MQW, the device length is set to 1.2 mm, and the length of a phase modulator portion to which electric field is applied is set to 0.5 mm. In this device, a 3 dB branch portion and a joint portion which are passive elements are designed in the same layer structure as the phase modulator portion. That is, the MQW (multi-quantum well) structure having the band gap wavelength of 1.45 μm is used as a waveguide layer. A modulation voltage (half-wavelength voltage) to the incident light of the wavelength of 1.55 μm is set to 4.2V, an optical quenching ratio at that time is equal to 13 dB, and an inter-fiber insertion loss is equal to 12 dB.

As described above, when semiconductor material, particularly the multi-quantum well structure is used as a refractive-index varying medium to form a Mach-Zehnder modulator, there is an advantage that the size of the modulator can be reduced to a smaller value of 1mm (i.e., an extremely compact modulator can be achieved) as compared with a modulator using dielectric material of LiNbO₃ or the like (the size thereof is equal to 10 mm).

As the band gap wavelength of the MQW is approached to the wavelength of the incident light, the variation of the refractive index under the same electric field intensity is larger and thus the half-wavelength voltage (a voltage required to vary the phase of light wave by π, that is, an operating voltage required to perform optical quenching) can be reduced. However, at the same time absorption of the incident light increases, so that the transmission loss of the transmitted light also increases.

In the Mach-Zehnder modulator as described above, the MQW having the same composition as the phase modulator portion is used for an incident light waveguide path portion, the 3 dB branch portion, the joint portion and an output light waveguide path portion which are also passive waveguide path portions. Therefore, some degree of refractive-index variation is expectable, and the band gap wavelength of MQW is determined so that the transmission loss can be suppressed to some extent.

However, the magnitude of the refractive-index variation and the magnitude of the transmission loss are dependent on each other, and the characteristic of the device is restricted by this tradeoff. In addition, the coupling loss between a semiconductor Mach-Zehnder type modulator and an optical fiber increases to about five times as large as that in the case of LiNbO₃.

In view of the foregoing, the half-wavelength voltage and the inter-fiber insertion loss increase to such high values that the actual system is not applicable. There are two methods to overcome this problem. According to a first method, the band gap of the waveguide layer may be varied by the phase modulator portion serving as an active element and the incident light waveguide path portion, the 3 dB branch portion, the joint portion and the output light waveguide path portion which serve as passive elements. That is, at the phase modulator portion, a band gap wavelength which is near to the wavelength of the incident light is used to achieve a large refractive variation by application of electric field, and at the other areas (portions), the band gap wavelength is set to an extremely shorter wavelength than that at the phase modulator portion to suppress the transmission loss to substantially zero.

According to a second method, the waveguide layers of the incident and output light waveguide paths is designed to be thin and the radiation angle of the light wave is set to a small value to reduce the coupling loss between the modulator and the fiber. However, a crystal growth process and an etching process must be repetitively carried out in order to partially vary the band gap wavelength and the layer thickness as described above, and thus the overall processes are complicated, and yield is reduced.

In the conventional semiconductor Mach-Zehnder modulator, as described above the same MQW structure as the phase modulator portion is applied to the incident light waveguide path portion, the 3 dB branch portion, the joint portion and the output light waveguide path portion which serve as passive waveguide path portions. Therefore, the device characteristic is restricted by the trade-off between the magnitude of the refractive-index variation and the transmission loss, and thus both the half-wavelength voltage and the inter-fiber insertion loss between the optical modulator and the fiber increase to those values which are not applicable to the actual system.

As described above, in order to overcome this problem, the band gap of the waveguide layer may be varied by the phase modulator portion serving as an active element and the incident light waveguide path portion, the 3 dB branch portion, the joint portion and the output light waveguide path portion which serve as passive waveguide path portions. Furthermore, by thinning the waveguide layers of the passive waveguide path portions independently of the active element, the radial angle at the end of the passive waveguide path portion is reduced and the coupling loss between the modulator and the fiber is suppressed, whereby the inter-fiber insertion loss can be reduced.

However, the crystal growth process and the etching process must be repetitively carried out in order to partially vary the band gap wavelength and the thickness of the waveguide layer thickness as described above, so that the manufacturing process is more complicated, and the yield is also reduced.

SUMMARY OF THE INVENTION

An object of the present invention is to provide the structure of a semiconductor Mach-Zehnder type modulator which is capable of reducing both a half-wavelength voltage and an interfiber insertion loss at the same time.

Another object of the present invention is to provide a method of achieving the above structure without repeating the crystal growth process and the etching process, and manufacturing a Mach-Zehnder type modulator having a low driving voltage and a low loss with high yield.

In order to attain the above objects, according to a first aspect of the present invention, a semiconductor Mach-Zehnder modulator which has a layer structure in which a semiconductor buffer layer, a semiconductor waveguide layer and a semiconductor clad layer are successively laminated on the principal surface of a semiconductor substrate, comprising: an incident light waveguide path through which an incident light beam is guided; a branch portion which has two waveguide paths and splits the light beam guided by the incident light waveguide path into two light beams on the two waveguide paths; a phase modulator portions which is connected to the two waveguide paths of the branch portion respectively; a joint portion for jointing the outputs of the two phase modulator portions; and an output light waveguide path through which the joined light beam from the joint portion is guided, wherein the wavelength of an absorption edge of each semiconductor waveguide layer of the incident light waveguide path, the branch portion, the joint portion and the output light waveguide path is set to be shorter than that of each waveguide layer of the phase modulator portions.

According to a second aspect of the present invention, a semiconductor Mach-Zehnder modulator which has a layer structure in which a semiconductor buffer layer, a semiconductor waveguide layer and a semiconductor clad layer are successively laminated on the principal surface of a semiconductor substrate, comprising: an incident light waveguide path through which an incident light beam is guided; a branch portion which has two waveguide paths and splits the light beam guided by the incident light waveguide path into two light beams on the two waveguide paths; a phase modulator portions which are connected to the two waveguide paths of the branch portion respectively; a joint portion for jointing the outputs of the two phase modulator portions; and an output light waveguide path through which the joined light beam from the joint portion is guided, wherein the thickness of each semiconductor waveguide layer of the incident light waveguide path and the output light waveguide path is set to be thinner than that of each waveguide layer of the phase modulator portions.

According to a third aspect of the present invention, a method of manufacturing a semiconductor Mach-Zehnder type modulator comprises the steps of: selectively forming a pair of first dielectric mask layers on a main surface of a semiconductor substrate so as to form a predetermined gap therebetween and face each other through the predetermined gap; successively and selectively growing a semiconductor buffer layer, a semiconductor waveguide layer and a semiconductor clad layer by using the pair of the first dielectric mask layers as a mask; selectively forming second dielectric masks on the semiconductor clad layer; and successively and selectively growing a clad layer and a semiconductor cap layer in a gap portion of the second dielectric masks, wherein the laminate structure in the gap between the pair of the first dielectric mask layers is used as a phase modulator portion and the residual portions other than the phase modulator portion are used as passive areas.

First, according to the semiconductor Mach-Zehnder type modulator of the present invention, the transmission loss of the incident light waveguide path, the branch portion, the joint portion and the output light waveguide path which serve as the passive areas is set to be lower than the transmission loss of the phase modulator portion serving as the active area. Therefore, the total transmission loss of the Mach-Zehnder type modulator can be more greatly reduced as compared with the case where the transmission loss of all the waveguide layers is same to the transmission loss of the active area.

Secondarily, according to the semiconductor Mach-Zehnder type modulator of the present invention, the band gap wavelength of the passive area is set to be shorter than that of the active area. That is, in the phase modulator portion, a band gap wavelength which is near to the wavelength of the incident light is set so that a large refractive variation is obtained by application of electric field. On the other hands, in the incident light waveguide path, the branch portion, the joint portion and the output light waveguide path, the band gap wavelength is set to be still shorter than that of the phase modulation portion, so that there occurs little transmission loss.

Thirdly, the thickness of the waveguide layers of the incident light waveguide path and the output light waveguide path in the Mach-Zehnder type modulator is set to be smaller than the thickness of the waveguide layer of the phase modulator portion, so that the coupling efficiency between the modulator and the fiber is higher and thus the coupling loss is lower.

In order to achieve the structure of the semiconductor Mach-Zehnder type modulator as described above, the present invention adopts a band gap control selection MOVPE (Metal Organic Vapor Phase Epitaxy: it is also abbreviated as OMVPE (Organo Metallic VPE)) crystal growth method. By using the selection MOVPE crystal growth method, a wafer having a band gap wavelength and a film thickness which varies partially and locally can be formed through only a single crystal growth process. Specifically, those areas which are sandwiched between dielectric masks are partially formed on a wafer and subjected to a selective crystal growth process, whereby two types of areas which are different in band gap energy (energy difference is 50 meV or more) and in film thickness (thickness difference is about 2 times) can be formed in the areas sandwiched between the dielectric masks and the other areas (which are not sandwiched between the dielectric masks) respectively on the same wafer by the single crystal growth process.

The present invention adopts the above selection MOVPE growth method, and the crystal growth process and the etching process are not required to be repeated in order to vary the band gap wavelength and the film thickness. Accordingly, according to the manufacturing method of the present invention, an ideal Mach-Zehnder type modulator which is different of the band gap and waveguide thickness between active areas and passive areas can be manufactured with high yield.

BRIEF DESCRIPTION OF THE DRAWINGS

FIG. 4 is a plan view showing an example of a first mask pattern for selective growth when the InGaAsP/InP multi-quantum well Mach-Zehnder type modulator of the embodiment of the present invention is manufactured;

DETAILED DESCRIPTION OF THE PREFERRED EMBODIMENT

A preferred embodiment according to the present invention will be described with reference to the accompanying drawings.

Figure 1:
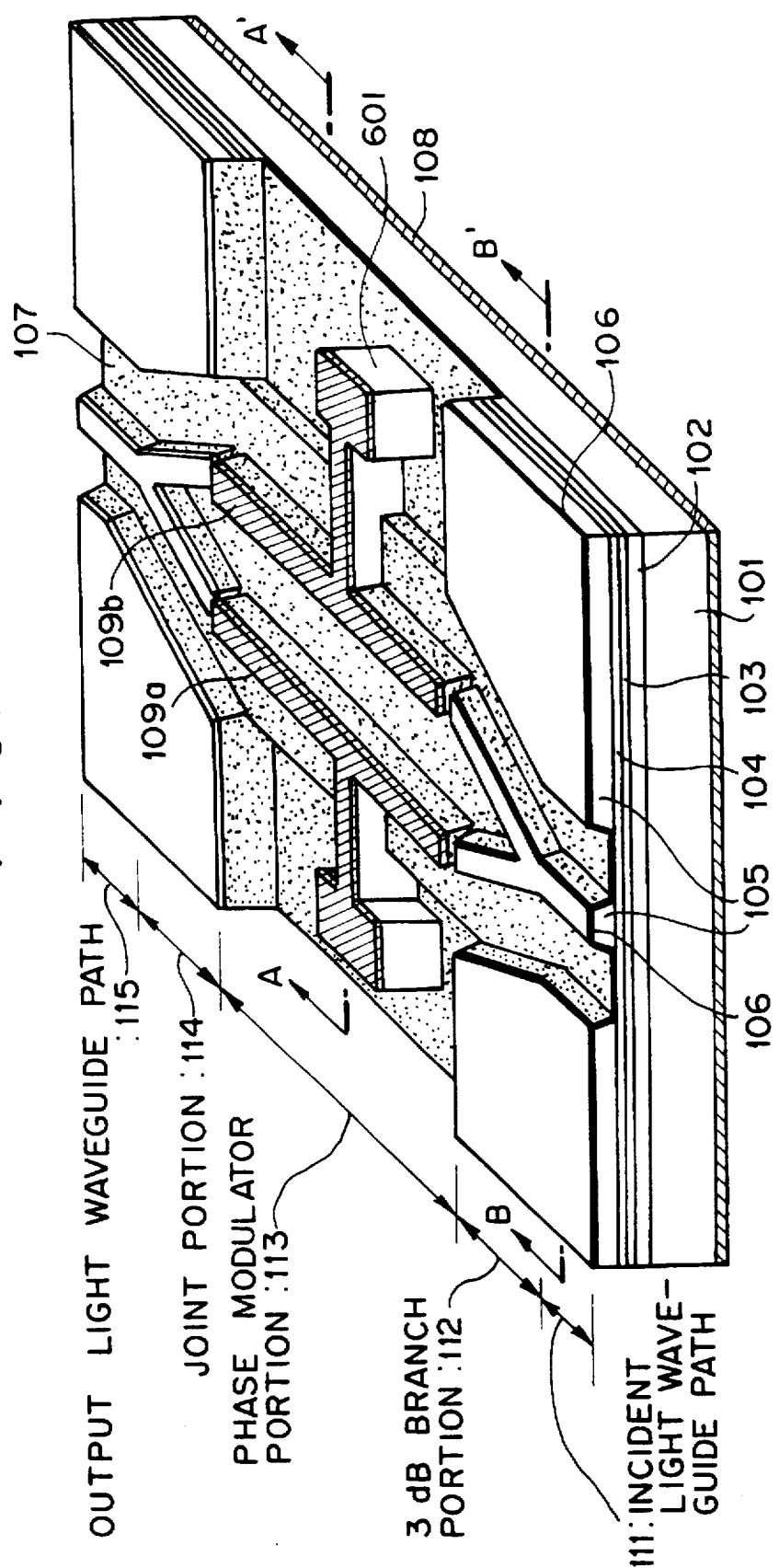
FIG. 1 is a perspective view showing the structure of InGaAsP/InP multi-quantum well (MQW) Mach-Zehnder type modulator of an embodiment of the present invention.

FIG. 1 is a perspective view showing an embodiment of an InP-based multiple quantum well (MQW) Mach-Zehnder modulator as a semiconductor Mach-Zehnder modulator.

First, a method of manufacturing the InP-based MQW Mach-zehnder type modulator shown in FIG. 1 will be described with reference to a series of manufacturing processes of FIGS. 2A to 2G and FIGS. 3A to 3G, wherein FIGS. 2A to 2G are cross-sectional views which are taken along a line A—A' of FIG. 1 and FIGS. 3A to 3G are cross-sectional views which are taken along a line B—B' of FIG. 1.

First, an $SiO_2$ film serving as a dielectric mask for selective growth is formed at a thickness of 1200 Å (angstrom) on the whole surface of an n-InP substrate of (100) face direction. Subsequently, the $SiO_2$ film is subjected to a patterning treatment by an ordinary photolithography technique to form an $SiO_2$ mask (see FIG. 2A). FIG. 4 shows a pattern of the $SiO_2$ mask 201 for selective growth which is viewed from the upper side of a wafer. As shown in FIG. 4, a phase modulator portion of the Mach-Zehnder type modulator is formed in an area 301 which is sandwiched between the two masks 201. The width Wg of the inter-mask area 301 between the masks 301 is set to 50 μm, and the mask width Wm is set to 200 μm.

Figure 2A:
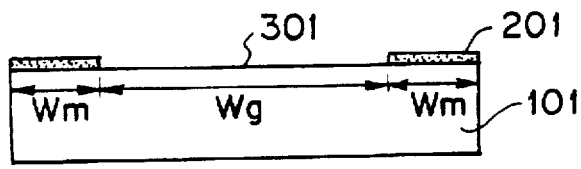
FIGS. 2A to 2G are cross-sectional views showing a series of manufacturing processes to explain the structure of the InGaAsP/InP multi-quantum well Mach-Zehnder type modulator of the embodiment of the present invention.
Figure 2B:
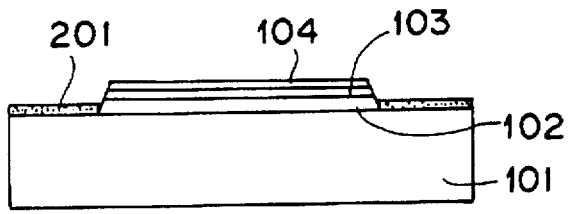
Figure 3A:
FIGS. 3A to 3G are cross-sectional views showing a series of other manufacturing processes to explain the structure of the InGaAsP/InP multi-quantum well Mach-Zehnder type modulator of the embodiment of the present invention.
Figure 3B:
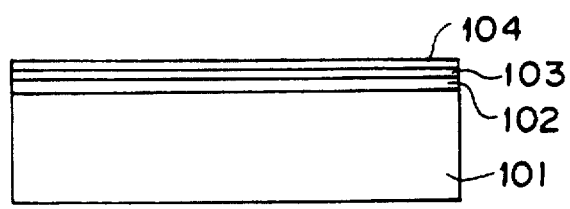

Subsequently, by using the $SiO_2$ films as the masks are successively laminated an n-InP buffer layer 102 (film thickness of 0.5 μm, carrier concentration of $1\times10^{18} cm^{-3}$), an i(intrinsic)InGaAsP/InP MQW waveguide layer 103 (20 periods of InGaAsP (10 nm)/InP(10 nm): layer thickness of 0.4 μm, carrier concentration of $5\times10^{15} cm^{-3}$), and an i-InP clad layer 104 (layer thickness of 0.1 μm, carrier concentration of $5\times10^{15} cm^{-3}$) by a selective MOVPE growth method (see FIGS. 2B and 3B).

In the phase modulator portion 113, the i-InGaAsP/InP MQW waveguide layer 103 is designed in a structure of 20-periods multi-quantum wells (MQW) which uses InGaAsP of composition wavelength of 1.52 μm as quantum wells. The thickness of the well layer is set to 100 Å and the thickness of the barrier layer is set to 50 μ in the phase modulator portion 113 so that the band gap wavelength is equal to 1.45 μm in the phase modulator portion 113. The thickness of the overall MQW waveguide layer is set to 0.3 μm.

The band gap wavelength and the thickness of the MQW waveguide layers of the inter-mask area 301 sandwiched between the SiO$_2$ masks 201 where the phase modulator portion of the Mach-Zehnder type modulator will be afterwards formed are largely different from those in areas other than the inter-mask area 301 (an incident light waveguide path 111, a 3 dB branch portion 112, a joint portion 114 and an output light waveguide path 115).

That is, the band gap wavelength of the areas other than the inter-mask area 301 is set to be shorter than the band gap wavelength of the inter-mask area 301, and the thickness of the MQW waveguide layer of the areas other than the inter-mask area 301 is set to be smaller than that of the inter-mask area 301. The band gap wavelength of the inter-mask area 301 is dependent on the mask width Wm and the width Wg between the masks (the width of the inter-mask area).

Figure 5:
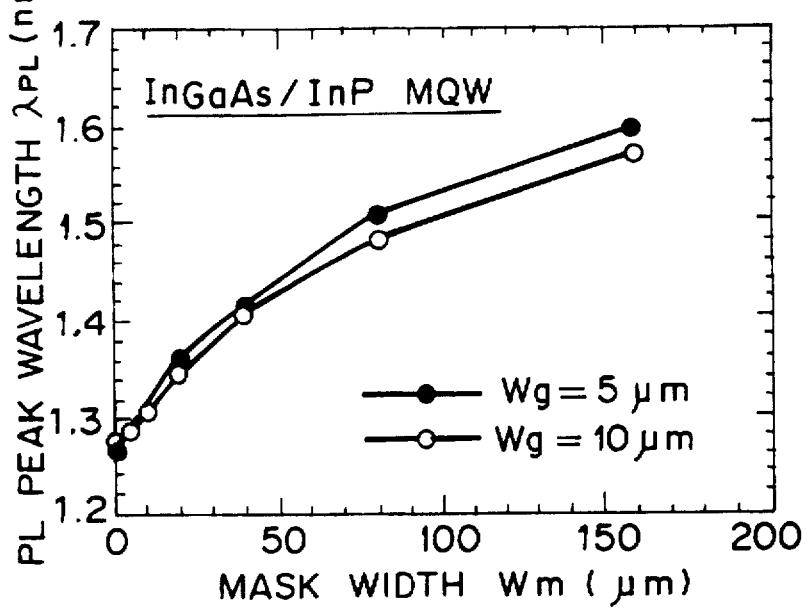
FIG. 5 is a graph showing a reported experiment result of a band gap control by selective growth.

FIG. 5 shows an experiment result which was reported by Aoki, et al. in Electronic Information Communication Associate of 1993 (the Spring Convention of Electronic Information Communication Associate of 1993: SC-2-6) it is apparent from FIG. 5 that the photoluminescence peak wavelength of InGaAs/InP MQW layer is dependent on the mask width Wm and the inter-mask area width Wg. As the mask width Wm is larger, the photo-luminescence peak wavelength is shifted to a long wavelength side. Further, as the inter-mask area width Wg is larger, the dependence on the mask width Wm is reduced a degree of depending on.

Figure 6:
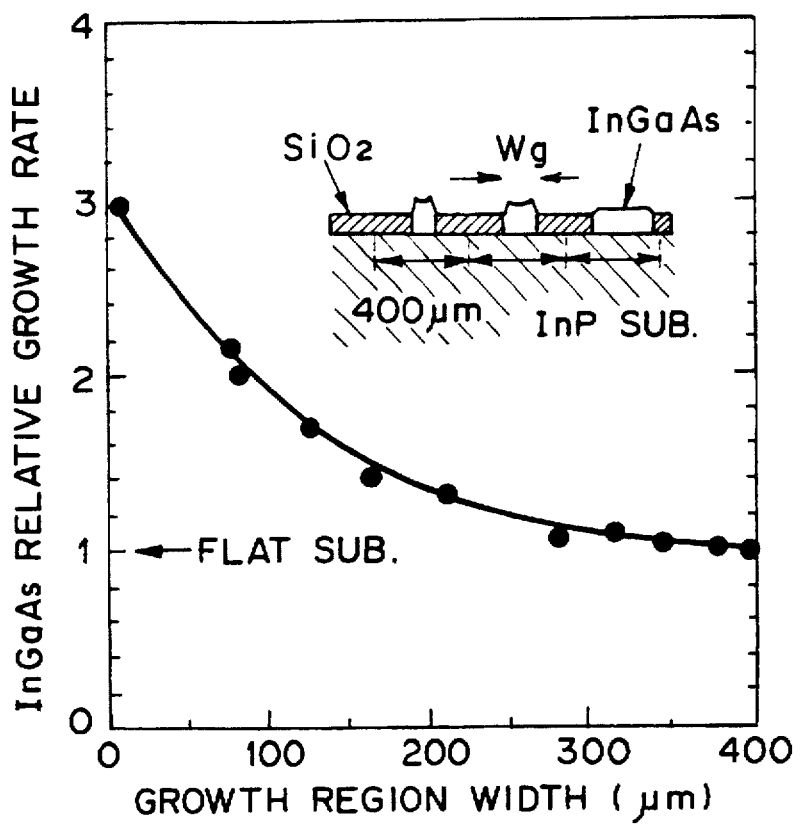
FIG. 6 is a graph showing a reported experiment result of a layer thickness control by selective growth.

FIG. 6 shows an experiment result (OQE91-176) which was reported by Takahashi, et. al. in Optical Electronics Research Associate (OQE) of 1991, and it is apparent from FIG. 6 that the relative growth rate (the ratio of the growth speed of the intermask area 301 to the growth speed of the areas other than the inter-mask area 301) of the InGaAs bulk layer is dependent on the width wg of the inter-mask area 301. As shown in FIG. 6, as the inter-mask area width wg is small, the relative growth rate increases. Accordingly, the band gap wavelength and the waveguide layer thickness of the MQW waveguide layer can be partially varied on a single wafer by suitably adjusting the width Wg and Wm.

Figure 2C:
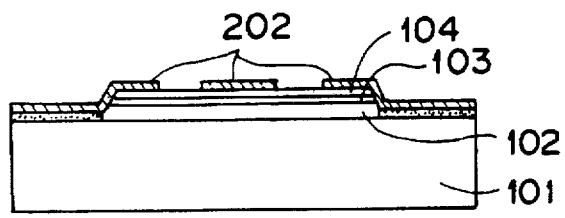
Figure 3C:
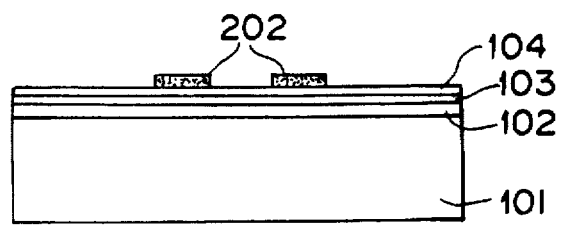
Figure 7:
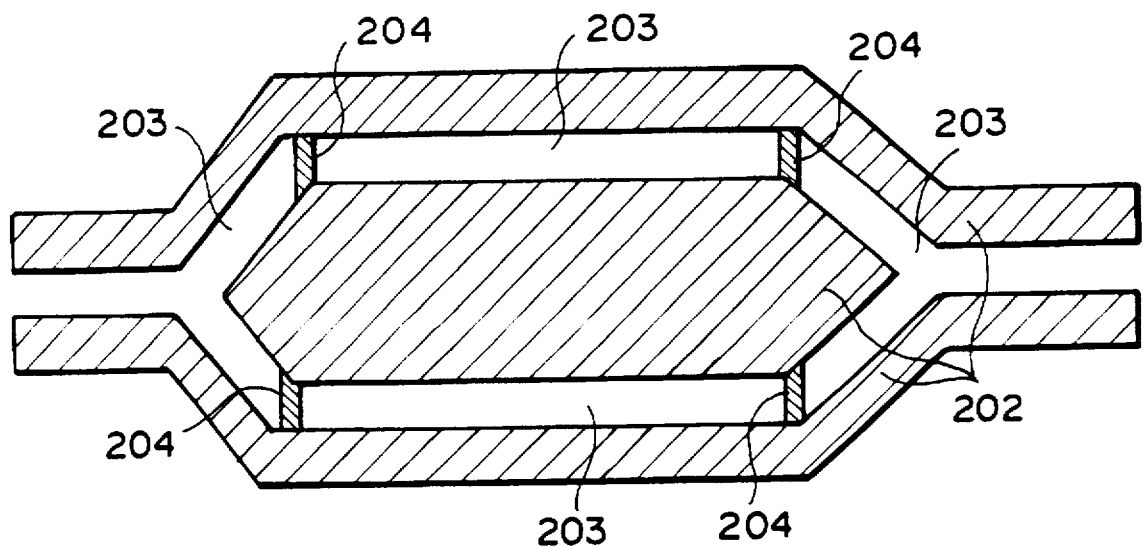
FIG. 7 is a plan view showing a second mask pattern for selective growth when the InGaAsP/InP multi-quantum well Mach-Zehnder type modulator of the embodiment of the present invention.

Subsequently, an SiO$_2$ film is formed on the whole surface of the wafer and patterned by the ordinary photolithography technique to form an SiO$_2$ mask 202 (see FIGS. 2C and 3C). FIG. 7 shows a pattern of the SiO$_2$ mask 202 for selective growth, which is viewed from the upper side of the wafer. The SiO$_2$ film is subjected to the patterning treatment to form the mask 202 for the selective growth so that the pattern of gap portions 203 is matched with a waveguide path pattern of the Mach-Zehnder type modulator.

In FIG. 7, an electrode separating mask 204 is formed to keep two p-side electrodes 109a and 109b shown in FIG. 1 to be electrically isolated from each other, and thus the electrical isolation can be held between the two p-side electrodes 109a and 109b even without carrying out the etching treatment on a cap layer, etc. after the crystal growth process. The stripe direction of the gap portions 203 corresponds to a [110] direction.

Figure 2D:
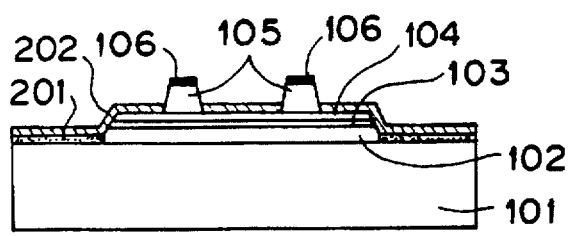
Figure 2E:
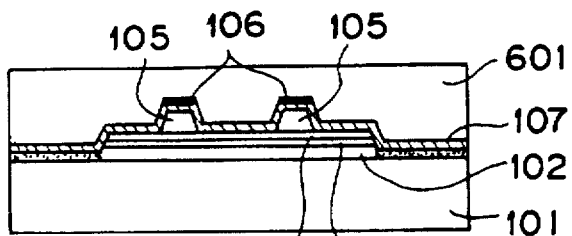
Figure 2F:
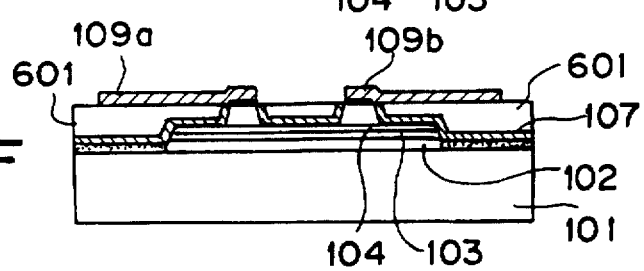
Figure 2G:
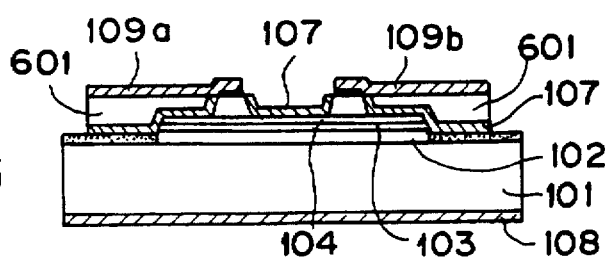
Figure 3D:
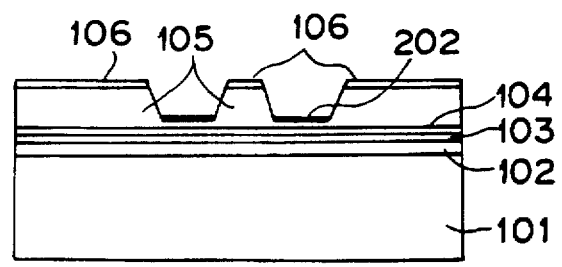
Figure 3E:
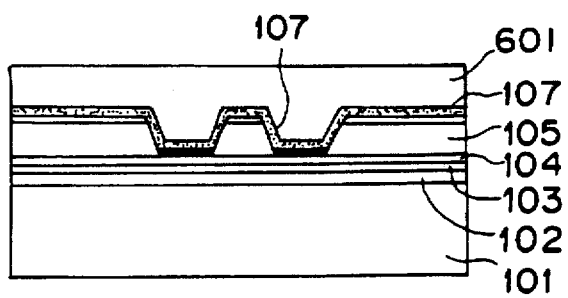
Figure 3F:
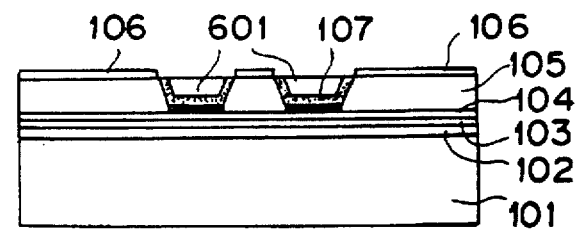
Figure 3G:
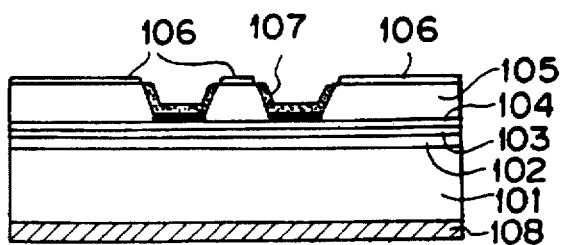

Subsequently, a p-InP clad layer 105 (layer thickness of 1.0 μm, carrier concentration of $5\times10^{17}$cm$^{-3}$) and a p-InGaAs cap layer 106 (layer thickness of 0.1 μm, carrier concentration of $1\times10^{19}$cm$^{-3}$) are successively and selectively laminated on only the gap portions 203 to achieve a ridge structure (see FIGS. 2D and 3D). Subsequently, an SiO$_2$ protection film 107 of 1000 Å (angstrom) thickness is formed on the whole surface of the wafer, and then a polyimide film 601 of 3 μm thickness is coated on the SiO$_2$ protection film 107 (see FIGS. 2E and 3E). Subsequently, the polyimide film 601 and the SiO$_2$ film 107 are uniformly removed until the p-InGaAs cap layer 106 is exposed, thereby forming pside electrodes 109a and 109b of Cr/Au (see FIGS. 2F and 3F).

Thereafter, the whole polyimide film is removed except for a part of the polyimide film located below the p-side electrodes 109a and 109b. Finally, the device is cleaved and the light incident and output end faces are coated with nonreflective coating to complete the manufacturing process of the device.

Next, an operation of the InP-based multi-quantum well (MQW) Mach-Zehnder type modulator shown in FIG. 1, which is produced according to the manufacturing method as described above, will be described hereunder.

Light wave of 1.55 μm wavelength which is incident from the incident light waveguide path 111 of the InP-based multi-quantum well Mach-Zehnder modulator shown in FIG. 1 is transmitted along the incident light waveguide path 111, and then split half-andhalf onto two waveguide paths in the 3 dB branch portion 112. Each of the branched waveguide paths is connected a phase modulator using the quantum confined stark effect (QCSE).

It is assumed that the p-side electrode 109a (109b) of one of the two phase modulators is connected to any n-side electrode 108 to be grounded while a reverse bias voltage is applied to only the p-side electrode 109b (109a) of the other phase modulator. When the reverse bias voltage is equal to zero V, two lights emitted from the two phase modulators are in phase, and thus these lights do not offset each other even when joined in the joint portion 114. Accordingly, the optical output can be obtained from the end of the output light waveguide path of the Mach-Zehnder type modulator, and at this time a switch-on state is set.

Figure 8:
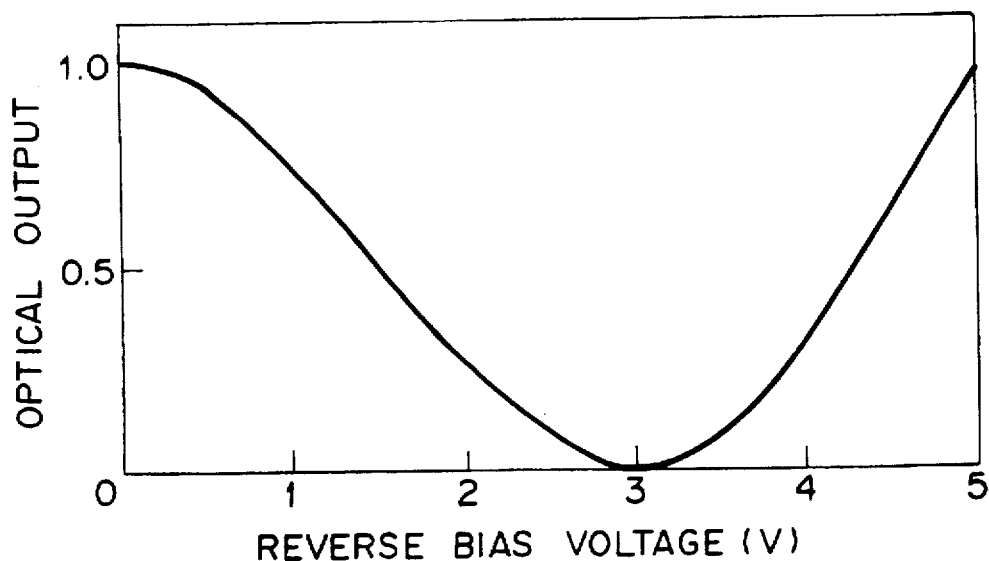
FIG. 8 is a graph showing an optical quenching characteristic of the InGaAsP/InP multi-quantum well Mach-Zehnder type modulator of the embodiment of the present invention.

On the other hand, when the reverse bias voltage is applied to shift (advance) the phase of the light emitted from one of the phase modulators by π, the lights emitted from the two phase modulators are out of phase, and thus they offse t each other when joined in the joint portion 114. Therefore, no optical output is obtained from the end of the output light waveguide path, and at this time a switch-off state is set. FIG. 8 shows the relationship between the switch on/off operation and the applied voltage. In the case of this embodiment, the on-state is set when the reverse bias voltage is equal to zero, and the off-state is set when the reverse voltage is equal to 3V.

Figure 9:
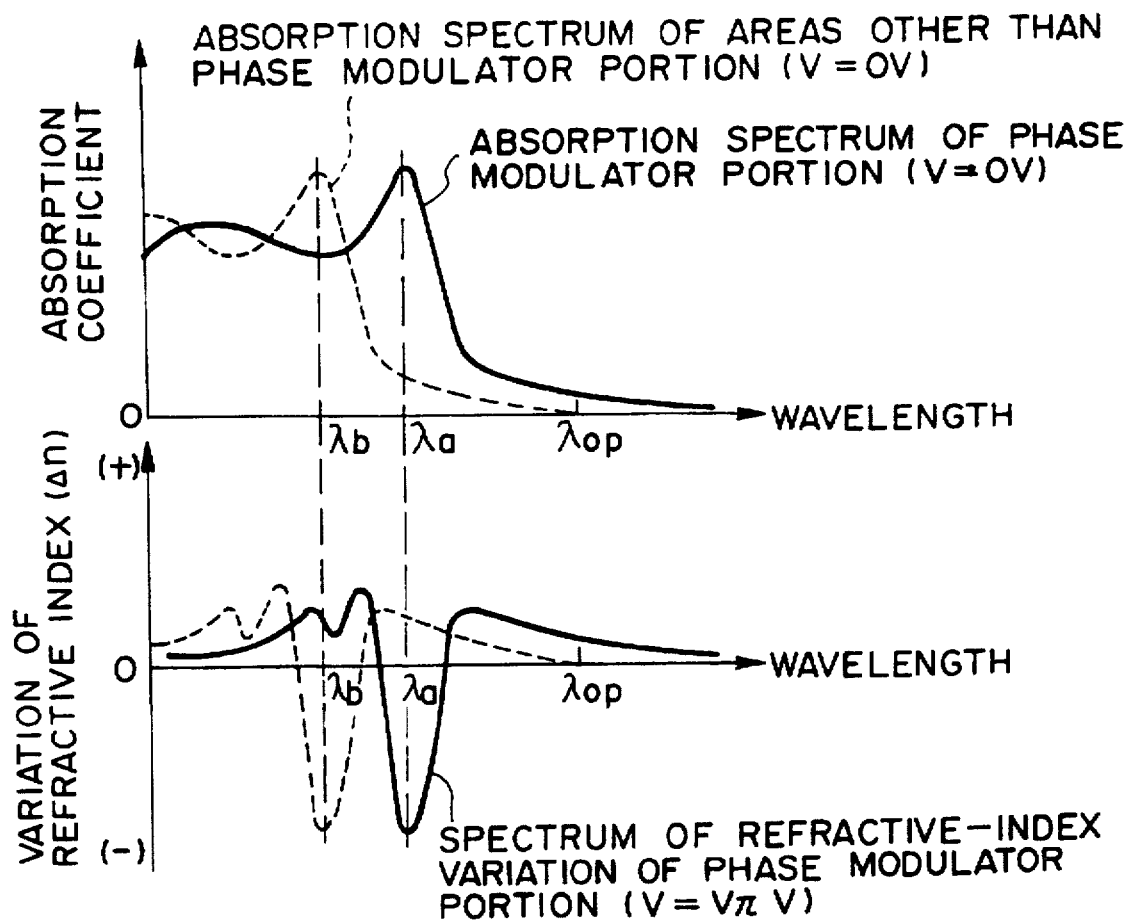
FIG. 9 is a diagram showing the principle of reduction in transmission loss of the Mach-Zehnder type modulator according to the present invention.

In the Mach-Zehnder type modulator shown in FIG. 1, the band gap wavelength is different between the phase modulator portion 113 and the other areas (the incident light waveguide path 111, the 3 dB branch portion 112, the joint portion 114 and the output light waveguide path 115). FIG. 9 schematically shows the absorption spectrum of MQW and the spectrum of the refractive-index variation by QCSE. In the phase modulator portion 113, the band gap wavelength λa is set to 1.45 μm so that a large refractive-index variation can be obtained by application of a voltage even if some absorption occurs. With this setting, the modulating operation can be performed with a low voltage. The wavelength λop is set to 1.55 μm.

On the other hand, the areas other than the phase modulator portion serve as p assive waveguide path portions, and thus no variation occurs in the refractive index by application of the voltage. That is, in the incident light waveguide path 111, the 3 dB branch portion 112, the joint portion 114 and the output light waveguide path 115, the band gap wavelength is preferably set to a wavelength which is as short as possible, whereby the loss due to absorption is reduced. In addition, it is ideal that the fiber coupling loss is reduced by reducing the waveguide layer thickness of the incident light waveguide path 111 and the output light waveguide path 115.

Therefore, in this embodiment, the band gap wavelength of the phase modulator portion is set to 1.45 µm while the band gap wavelength λb of the areas other than the phase modulator portion is set to 1.40 µm. At this time, as is apparent from FIG. 9, the absorption coefficient at the incident light wavelength λ is small in the areas other than the phase modulator portion, and the transmission loss can be reduced more remarkably as compared with the case where the band gap wavelength is set to 1.45 µm in all the areas.

Figure 10:
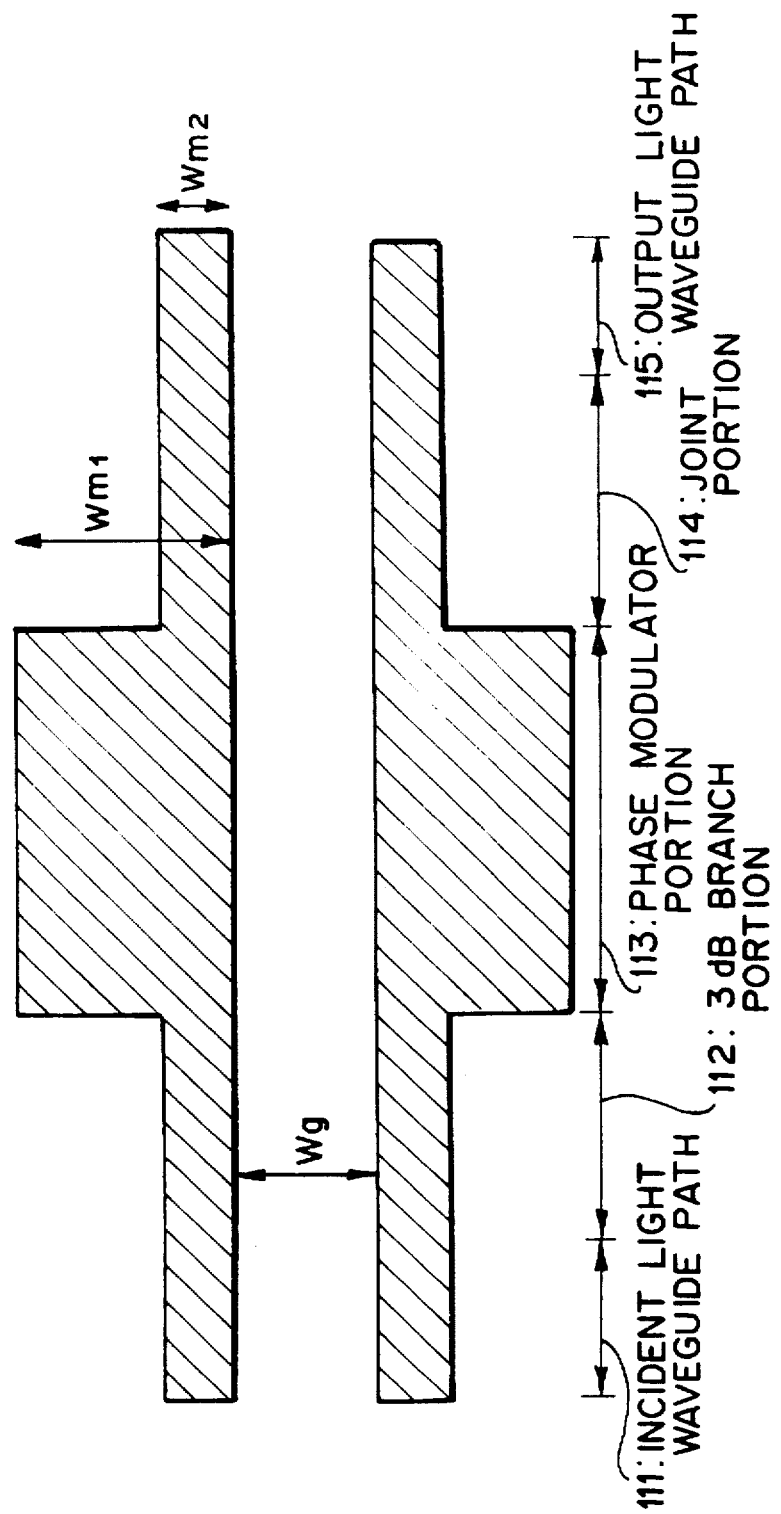
FIG. 10 is a plan view showing the first mask pattern for selective growth.

In addition, according to the present invention, the selective MOVPE growth method is used to make a difference in band gap wavelength between the phase modulation area and the other areas. When the selective growth mask 201 shown in FIG. 4 is used, the band gap of the phase modulator portion can be set to a longer wavelength than the band gap of the areas other than the phase modulator portion, and at the same time the waveguide layer thickness of the areas other than the phase modulator portion can be set to a smaller value than that of the phase modulator portion. A mask pattern shown in FIG. 10 is effectively used as the mask 201 for selective growth.

That is, the mask width Wm1 at both sides of the gap portion where the active areas of the Mach-Zehnder type modulator are formed is set to be larger than the mask width Wm2 at both sides of the gap portion where the passive areas are formed, whereby the band gap and the layer thickness on the same wafer can be partially varied. In this case, by suitably adjusting Wm1 and Wm2, the optimum band gap distribution and the optimum layer thickness distribution can be formed on the basis of the embodiment as described above. As described above, according to the method using the selective MOVPE growth method as described above, not only the transmission loss, but also the fiber coupling loss can be reduced.

Further, according to this method, the semiconductor layer can be simply manufactured without repeating the etching process and the crystal growth process, so that the yield can be improved remarkably. As described above, according to the present invention, the Mach-Zehnder type modulator having a still lower transmission loss than the conventional one can be achieved.

In the Mach-Zehnder type modulator shown in FIG. 1, the n-InP buffer layer 102, the MQW waveguide layer 103, the i-InP clad layer 104, the p-InP clad layer 105 and the p-InGaAs ap layer 106 are not laminated below a pat of the voltage applied portion of the p-side electrodes 109a and 109b. Therefore, a thicker polyimide film 601 can be buried, and the pat capacity can be reduced. As described above, the Mach-Zehnder type modulator of the present invention can perform its modulating operation at a high speed of 10 Gb/s order by using an electrode capacity reducing method.

The present invention is not limited to the above-mentioned embodiment. In the above embodiment, the Mach-Zehnder modulator having the InP-based multi-quantum well structure is described as an embodiment, however, this invention is not limited to this embodiment. The present invention is also applicable to InGaAs/InP multi-quantum well structure of InP group or InGaAs/InGaAsP multi-quantum well structure. Furthermore, the present invention is also applicable to a Mach-Zehnder modulator having InP-based bulk waveguide structure or a Mach-Zehnder modulator using other semiconductor materials of GaAs group or the like. Even when a bulk semiconductor is used as a light waveguide layer, its composition is varied in accordance with the mask width when the selective growth is performed. Therefore, an area in which the sand gap wavelength and the layer thickness are partially (locally) varied can be formed by performing the selective growth process only once. The present invention is effectively applicable to a Mach-Zehnder modulator using a bulk semiconductor as a waveguide layer. Furthermore, the present invention are not limited to the device shape shown in the embodiment, that is, the thickness of each layer, the composition of each layer, the dimension of the waveguide path, etc. may be modified.

As described above, according to the present invention, a semiconductor Mach-Zehnder modulator which operates with a low driving voltage and has a low loss and a high wide-band can be manufactured at high yield according to a simple method without complicated manufacturing process. According to the present invention, when the Mach-Zehnder modulator is produced, no etching treatment is conducted on the semiconductor, and a thin dielectric film (for example, $SiO_2$) serving as a mask when the selective growth is carried out is patterned by an etching treatment to selectively perform the crystal growth. In addition, in order to vary the band gap wavelength and the layer thickness in a specific area, it is sufficient to sandwich the area between $SiO_2$ masks having a suitable width. It is remarkably easier to finely pattern the thin dielectric film over a broad area with excellent reproductivity than to etch the semiconductor in a pm-order depth. Therefore, according to the manufacturing method of the present invention, an ideal semiconductor Mach-Zehnder modulator having partially different band gap wavelength and layer thickness can be manufactured over a broad area with excellent reproductivity.

What is claimed is:

1. A semiconductor Mach-Zehnder modulator which has a layer structure in which a semiconductor buffer layer, a semiconductor waveguide layer and a semiconductor clad layer are successively laminated on the principal surface of a semiconductor substrate, comprising:

an incident light waveguide path through which an incident light beam is guided;

a branch portion which has two waveguide paths and splits the light beam guided by said incident light waveguide path into two light beams on said two waveguide paths;

a phase modulator portions which is connected to said two waveguide paths of said branch portion respectively;

a joint portion for jointing the outputs of said two phase modulator portions; and an output light waveguide path through which the joined light beam from said joint portion is guided, wherein the wavelength of an absorption edge of each semiconductor waveguide layer of said incident light waveguide path, said branch portion, said joint portion and said output light waveguide path is set to be shorter than that of each waveguide layer of said phase modulator portions.

2. The semiconductor Mach-Zehnder modulator as claimed in claim 1, wherein said semiconductor substrate is formed of a n-type InP layer, said buffer layer is formed of a n-type InP layer, said waveguide layer is formed of an intrinsic InGaAsP/InP layer, and said clad layer is formed of a intrinsic InP layer and of a p-type InP layer on said intrinsic InP layer.

3. The semiconductor Mach-Zehnder modulator as claimed in claim 1, wherein said semiconductor waveguide layer is designed in a multi-quantum well structure of a predetermined period which uses InGaAsP as quantum wells.

4. The semiconductor Mach-Zehnder modulator as claimed in claim 1, wherein each of said phase modulator portions is provided with a cap layer, and phase modulation is performed in at least said one waveguide paths by using a quantum confined stark effect.

5. The semiconductor Mach-Zehnder modulator as claimed in claim 1, wherein said phase modulator portions are provided with electrodes, and one electrode which is provided to one of said two waveguide paths is grounded while a reverse bias voltage is applied to the other electrode which is provided to the other of said two waveguide paths, whereby a phase difference between said two waveguide paths is shifted by $\pi$.

6. The semiconductor Mach-Zehnder modulator as claimed in claim 1, wherein said semiconductor waveguide layer is designed in a multi-quantum well structure.

7. A semiconductor Mach-Zehnder modulator which has a layer structure in which a semiconductor buffer layer, a semiconductor waveguide layer and a semiconductor clad layer are successively laminated on the principal surface of a semiconductor substrate, comprising:

an incident light waveguide path through which an incident light beam is guided;

a branch portion which has two waveguide paths and splits the light beam guided by said incident light waveguide path into two light beams on said two waveguide paths;

a phase modulator portions which is connected to said two waveguide paths of said branch portion respectively;

a joint portion for jointing the outputs of said two phase modulator portions; and an output light waveguide path through which the joined light beam from said joint portion is guided, wherein a thickness of each semiconductor waveguide layer of said incident light waveguide path and said output light waveguide path is set to be thinner than that of each waveguide layer of said phase modulator portions.

8. The semiconductor Mach-Zehnder modulator as claimed in claim 7, wherein said semiconductor waveguide layer is designed in a multi-quantum well structure.

9. The semiconductor Mach-Zehnder modulator as claimed in claim 7, wherein said semiconductor substrate is formed of a ntype InP layer, said buffer layer is formed of a n-type InP layer, said waveguide layer is formed of an intrinsic InGaAsP/InP layer, and said clad layer is formed of a intrinsic InP layer and of a p-type InP layer on said intrinsic InP layer.

10. The semiconductor Mach-Zehnder modulator as claimed in claim 7, wherein said semiconductor waveguide layer is designed in a multi-quantum well structure of a predetermined period which uses InGaAsP as quantum wells.

11. The semiconductor Mach-Zehnder modulator as claimed in claim 7, wherein each of said phase modulator portions is provided with a cap layer, and phase modulation is performed in at least said one waveguide paths by using a quantum confined stark effect.

12. The semiconductor Mach-Zehnder modulator as claimed in claim 7, wherein said phase modulator portions are provided with electrodes, and one electrode which is provided to one of said two waveguide paths is grounded while a reverse bias voltage is applied to the other electrode which is provided to the other of said two waveguide paths, whereby a phase difference between said two waveguide paths is shifted by $\pi$.

* * * * *